(12) United States Patent
Kurz et al.

(10) Patent No.: US 11,734,570 B1
(45) Date of Patent: Aug. 22, 2023

(54) TRAINING A NETWORK TO INHIBIT PERFORMANCE OF A SECONDARY TASK

(71) Applicant: Apple Inc., Cupertino, CA (US)

(72) Inventors: Daniel Kurz, Sunnyvale, CA (US); Thomas Gebauer, Sunnyvale, CA (US); Dewey H. Lee, Sunnyvale, CA (US); Muhammad Ahmed Riaz, Santa Clara, CA (US); Qian Wang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 836 days.

(21) Appl. No.: 16/666,850

(22) Filed: Oct. 29, 2019

Related U.S. Application Data

(60) Provisional application No. 62/768,057, filed on Nov. 15, 2018.

(51) Int. Cl.
*G06N 3/084* (2023.01)
*G06F 9/48* (2006.01)
*G06N 20/00* (2019.01)
*G06N 5/046* (2023.01)

(52) U.S. Cl.
CPC ............... *G06N 3/084* (2013.01); *G06F 9/48* (2013.01); *G06N 5/046* (2013.01); *G06N 20/00* (2019.01)

(58) Field of Classification Search
CPC ........... G06N 3/084; G06N 20/00; G06F 9/48; G06N 5/046
See application file for complete search history.

(56) References Cited

U.S. PATENT DOCUMENTS

2018/0068218 A1\* 3/2018 Yoo et al. ............... G06F 18/00
2018/0157972 A1\* 6/2018 Hu et al. ................. G06N 3/00

\* cited by examiner

*Primary Examiner* — Hermon Asres
(74) *Attorney, Agent, or Firm* — DLA PIPER LLP (US)

(57) ABSTRACT

The present disclosure describes techniques for training a neural network such that the trained network can be implemented to perform a utility task (e.g., a classification task) while inhibiting performance of a secondary task (e.g., a privacy-violating task). In some embodiments, the techniques include training a neural network using a first loss associated with a first task and a second loss associated with a second task different from the first task. In some embodiments, this includes performing a first training operation associated with the first loss, and performing a second training operation associated with the second loss, wherein the second training operation includes providing, to the neural network, a plurality of input items associated with the second task.

24 Claims, 9 Drawing Sheets

600

601
Train a neural network using a first loss associated with a first task and a second loss associated with a second task different from the first task.

602
Perform a first training operation associated with the first loss.

603
Perform a second training operation associated with the second loss, wherein the second training operation includes providing, to the neural network, a plurality of input items associated with the second task.

TRAINING A NETWORK TO INHIBIT PERFORMANCE OF A SECONDARY TASK

CROSS-REFERENCE TO RELATED APPLICATIONS

This application claims priority to U.S. Provisional Application No. 62/768,057, filed Nov. 15, 2018, and entitled "TRAINING A NETWORK TO INHIBIT PERFORMANCE OF A SECONDARY TASK," the entire contents of which are hereby incorporated by reference.

TECHNICAL FIELD

The present disclosure relates generally to neural networks, and more specifically to techniques for training a network to enable performance of a primary task while inhibiting the performance of a secondary task.

BACKGROUND

Conventional electronic devices use neural networks to perform various image processing tasks, such as object detection, pose estimation, image classification, or the like. In many cases, due to computation requirements, a full version of the image may be uploaded to a server where the image processing task is then performed. Images subject to processing often include image data that is irrelevant to the desired task, which unnecessarily increases the bandwidth needed to transmit the image and computational expense of performing the task. In some instances, image data includes sensitive data that a user may not want exposed to other parties. When an adversarial party gains access to the images uploaded to the network, they can, for instance, obtain and/or exploit this sensitive data. Accordingly, there is a need for improved techniques for processing an image.

SUMMARY

The present disclosure describes techniques for training a network such that the trained network can be implemented to perform a utility task (e.g., a classification task) while inhibiting performance of a secondary task (e.g., a privacy-violating task). In some embodiments, the techniques include, at an electronic device: training a neural network using a first loss associated with a first task and a second loss associated with a second task different from the first task, including: performing a first training operation associated with the first loss, and performing a second training operation associated with the second loss, wherein the second training operation includes providing, to the neural network, a plurality of input items associated with the second task.

In some embodiments, a device for training a network such that the trained network can be implemented to perform a utility task (e.g., a classification task) while inhibiting performance of a secondary task (e.g., a privacy-violating task) includes one or more processors and memory storing one or more programs configured to be executed by the one or more processors. The one or more programs include instructions for: training a neural network using a first loss associated with a first task and a second loss associated with a second task different from the first task, including: performing a first training operation associated with the first loss, and performing a second training operation associated with the second loss, wherein the second training operation includes providing, to the neural network, a plurality of input items associated with the second task.

In some embodiments, a non-transitory (or, optionally, transitory) computer-readable storage medium storing one or more programs configured to be executed by one or more processors trains a network such that the trained network can be implemented to perform a utility task (e.g., a classification task) while inhibiting performance of a secondary task (e.g., a privacy-violating task). The one or more programs include instructions for: at an electronic device: training a neural network using a first loss associated with a first task and a second loss associated with a second task different from the first task, including: performing a first training operation associated with the first loss, and performing a second training operation associated with the second loss, wherein the second training operation includes providing, to the neural network, a plurality of input items associated with the second task.

BRIEF DESCRIPTION OF THE FIGURES

For a better understanding of the various described embodiments, reference should be made to the Detailed Description below, in conjunction with the following drawings in which like reference numerals refer to corresponding parts throughout the figures.

FIG. 6 illustrates an example process for training a network, according to various embodiments of the present disclosure.

DETAILED DESCRIPTION

Figure 1A:
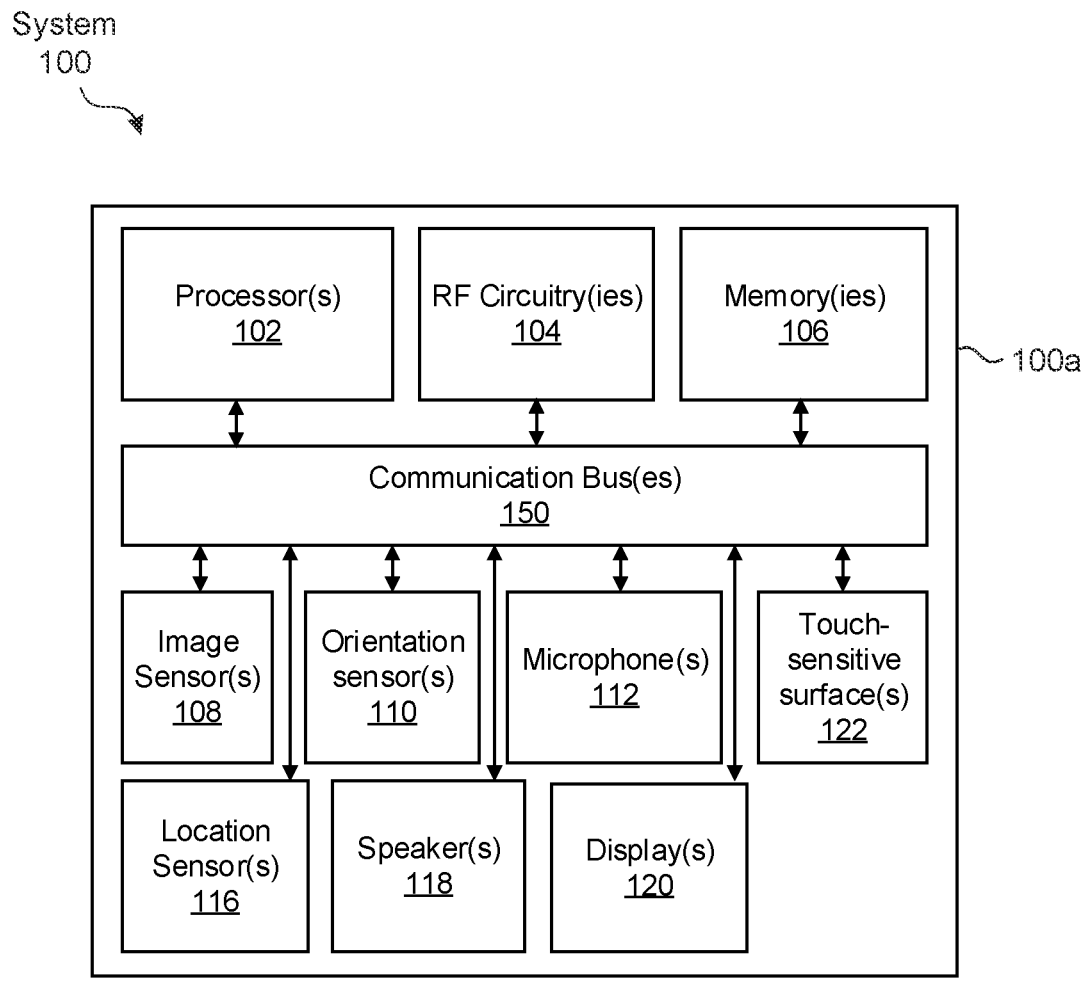
FIGS. 1A and 1B illustrate exemplary systems for implementing machine learning, according to various embodiments of the present disclosure.

The following description sets forth exemplary methods, parameters, and the like. It should be recognized, however, that such description is not intended to limit the scope of the present disclosure but is instead provided as a description of exemplary embodiments.

Neural networks (e.g., convolutional neural networks, recurrent neural networks, Siamese networks, etc.) are typically trained to optimize performance of a primary task or "utility task" such as, for example, object detection (e.g., determining from an image whether or not a predefined object is visible in the image and, optionally, the location of the object in the image (object localization)), scene classification (e.g., determining from an image the category of the scene (e.g., living room, kitchen, park, street, forest, beach, mountains, etc.) visible in the image), human pose estimation (e.g., determining the position and/or orientation of at least parts of a human body visible in an image), and speech recognition (e.g., determining which words are being spoken in an audio sample (also referred to as "speech to text")). When the trained neural network is being used to perform the utility task, the network is considered to be used for "inference," which may be performed using an electronic device such as, for example, a mobile phone. The performance metric of the neural network depends on the specific utility task and is expressed as a utility loss that the training procedure attempts to minimize. This utility loss may be, for example, one-minus-intersection-over-union for an object detection task, or cross-entropy loss for classification tasks.

When training the neural network, the network learns features (e.g., through activations at intermediate layers of the network) that are helpful for solving the utility task. These features are often generic enough to also perform tasks for which the network was not specifically trained. For example, in some embodiments, a neural network is capable of performing face identification (e.g., determining the identity of a person whose face is visible in an image. In some embodiments, this may include face verification, which is determining if the identity of a person whose face is visible in an image is identical to the identity of a person whose face is visible in a reference image.), optical character recognition (e.g., determining from an image the written or printed characters (and words) visible in the image), or input image reconstruction tasks using only the features that were generated to perform a utility task (e.g., scene classification) using an input image. In some embodiments, the neural network is capable of voice recognition (e.g., determining the identity of a person speaking in an audio sample (also referred to as "speaker identification")) or input audio reconstruction tasks using only the features that were generated to perform a utility task (e.g., speech recognition) using an audio input. This versatility in the network can be problematic if a malicious attacker (e.g., a party having access to features learned using the network) obtains access to the features, as the features can be exploited to violate the user's privacy by, for example, extracting sensitive information such as sensitive text (e.g., social security numbers, addresses, credit card numbers, phone numbers, etc.) in the input image or identifying the face or voice of the user or other persons associated with the input.

The present disclosure provides various techniques for preventing such an attack on a user's privacy by training a neural network such that features it extracts, during inference, enable performance of a utility task, while also inhibiting performance of secondary tasks (e.g., other defined tasks). For example, in some embodiments, the disclosed techniques allow for classification of an input image (e.g., scene classification) or audio sample (e.g., for speech recognition), while also obfuscating and/or otherwise discarding information that is unnecessary for performing the utility task so that the unnecessary information (e.g., private or sensitive information) cannot be used for other purposes. In other words, the disclosed techniques train the network so that when input data provided to the network during inference is an image (e.g., still image, video, etc.), the features extracted from the input image allow for performance of the utility task (e.g., classification of the input image), but do not allow for certain privacy-violating tasks such as, for example, face identification, optical character recognition, or reconstruction of the input image. Similarly, when the input data provided to the network during inference is an audio sample, the features extracted from the input audio allow for performance of the utility task (e.g., speech recognition), but do not allow for certain privacy-violating tasks such as, for example, voice recognition or reconstruction of the input audio. As a result, performance of the utility task is preserved while also inhibiting exploitation of the features for specific privacy-violating tasks. In some embodiments, this may result in increased computational efficiency, which reduces the computational workload and increases battery performance when the network is implemented using an electronic device.

In some embodiments, the trained network can be implemented using an electronic device to, for example, process a media item (e.g., an image, a video, an audio file, etc.) to perform a utility task. An example of such an electronic device is described below with respect to FIGS. 1A and 1B. In accordance with the embodiments disclosed herein, the processing is performed using a machine-learned model to classify, for example, an input image that includes sensitive information such a person's face or text. However, features used to classify the image cannot be used (e.g., by a malicious actor having access to the network) to reconstruct or identify the face of the person or to perform optical character recognition to identify text in the original input image. As such, the device (in combination with the trained network) permits a user to upload a representation of an image having sensitive information without fear that the sensitive information will be exploited for unintended purposes such as, for example, to violate the user's privacy. In some embodiments, the device (in combination with the trained model) can be utilized to process an audio file such that it generates features that are useful to perform the utility task of speech recognition while remaining invariant to the identity of the speaker (i.e., the person speaking in the audio file cannot be identified using the features generated by the trained model).

Figure 1B:
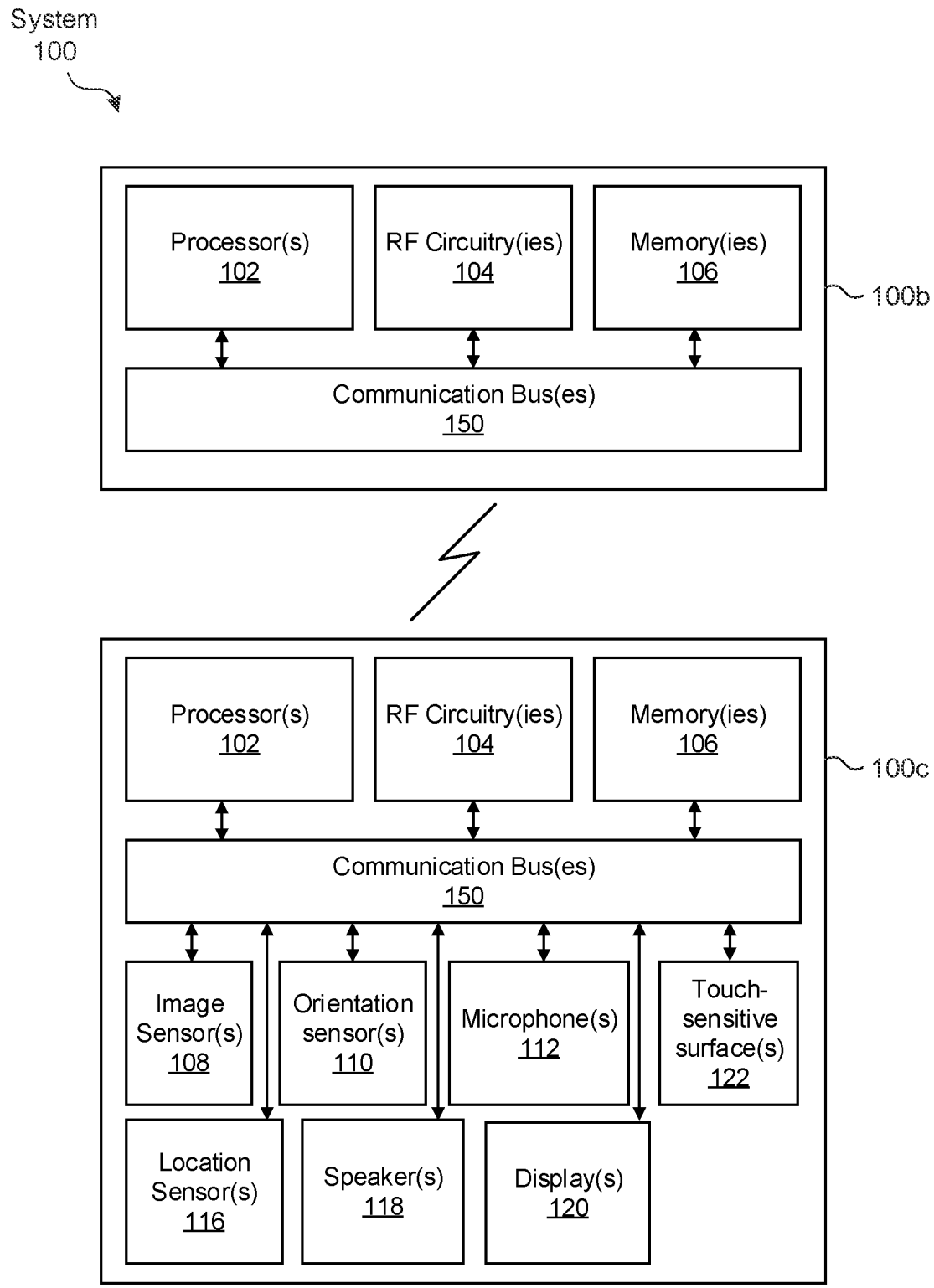

FIG. 1A and FIG. 1B depict exemplary system 100 for implementing a machine-learned model to perform a visual search of an image (e.g., still image or video) or recognize words in an audio file, according to various embodiments disclosed herein. In some embodiments, one or more components of system 100 (e.g., device 100a) can be used to train a neural network in accordance with the various embodiments disclosed herein.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some embodiments, system 100 is a mobile device. In some embodiments, system 100 is a head-mounted display (HMD) device. In some embodiments, system 100 is a wearable HUD device.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some embodiments, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensor(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 includes microphone(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

Figure 2A:
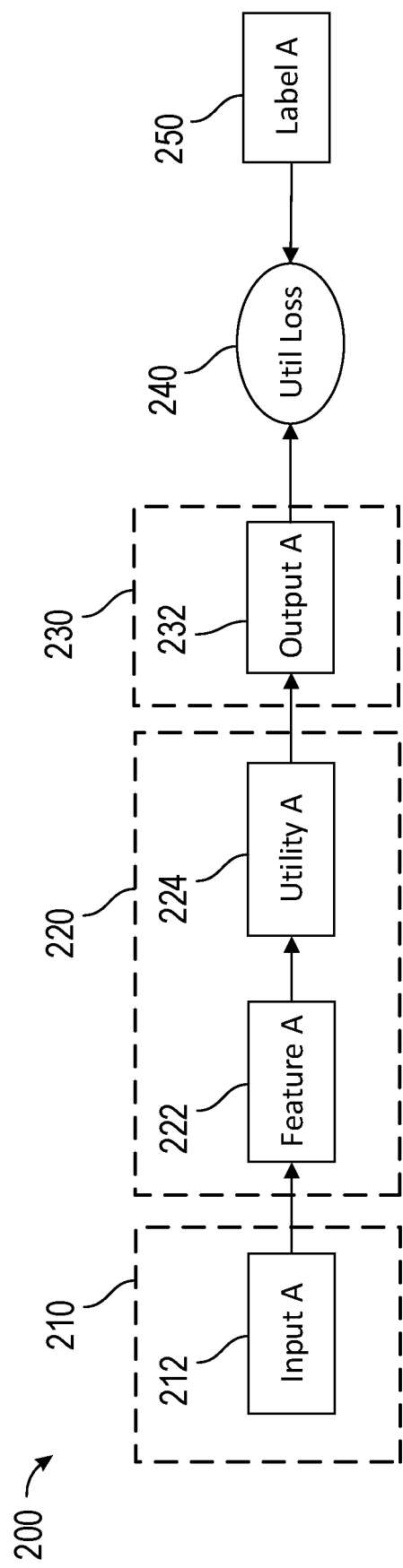
FIGS. 2A and 2B illustrate example networks, according to various embodiments of the present disclosure.
Figure 2B:
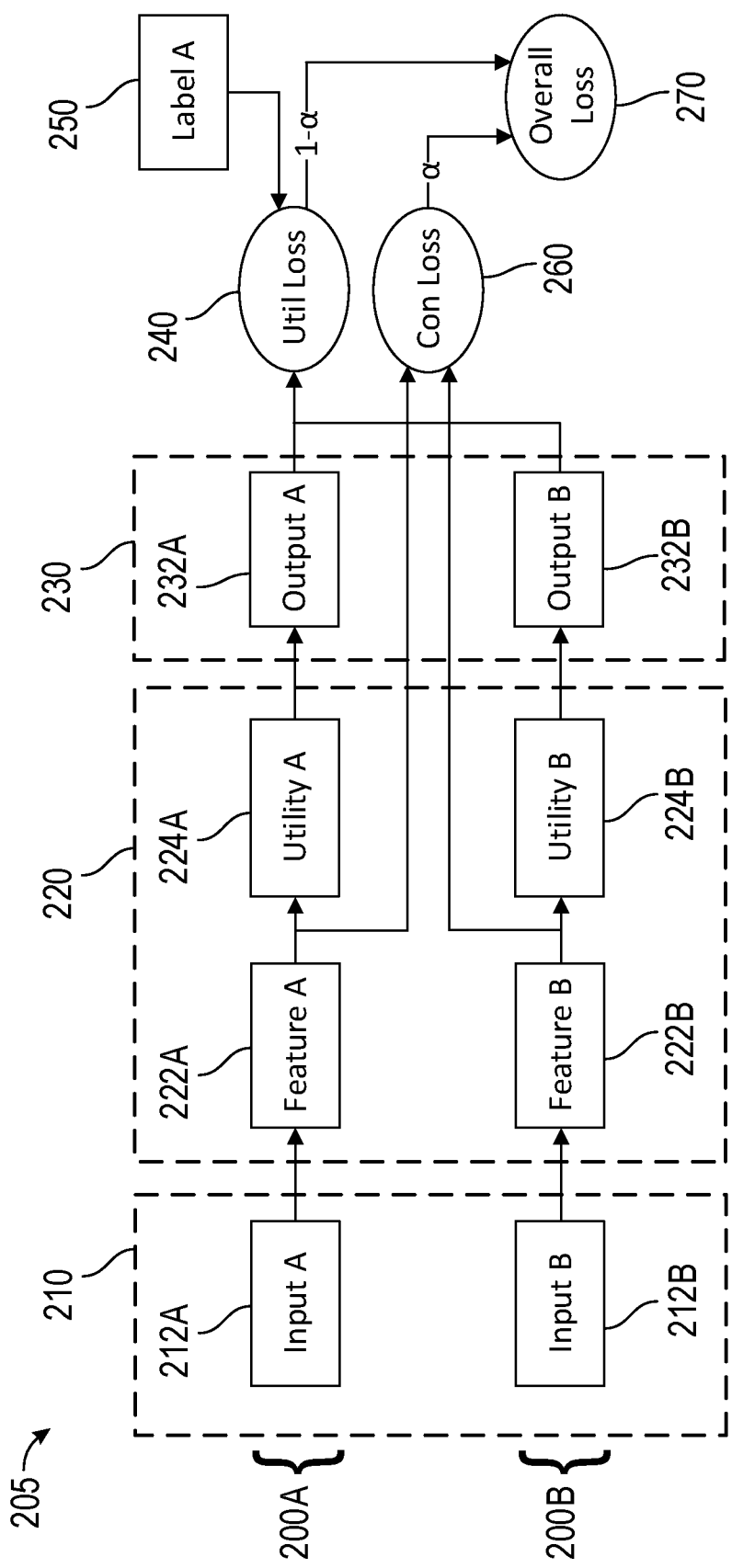

In accordance with the embodiments disclosed herein, an electronic device (e.g., 100*a*) can implement a machine learning model to process input data (e.g., image data, audio data, etc.) using a neural network trained in accordance with the present disclosure. FIGS. 2A-6 are provided to support the description of various techniques used to train the network. Specifically, FIG. 2A illustrates an example embodiment of a neural network 200 (e.g., a convolutional neural network) that is trained to enable, at inference, performance of the utility task while inhibiting performance of a secondary task. FIG. 2B illustrates an example of a Siamese network architecture used to train neural network 200. FIGS. 3A-6 are provided to support various exemplary embodiments in which network 200 is trained, using the Siamese network architecture, to enable performance of a utility task while also inhibiting performance of a secondary task. The embodiments discussed with respect to FIGS. 3A-4C are directed to the utility task of scene classification in an image and the inhibited secondary task of identifying faces in the image (face identification). It should be understood, however, that the network can be trained to perform other utility tasks and inhibit other secondary tasks. For example, the network can be trained to perform the utility task of speech recognition in an audio sample while inhibiting the secondary task of identifying the person speaking in the audio sample based on their voice.

As such, the present disclosure describes exemplary techniques for training neural network 200, using a Siamese network architecture, to process input data such as, for example, media data (e.g., still image, video, audio, etc.) such that features it extracts enable performance of a utility task (e.g., classification of an input image, such as scene classification; e.g., speech recognition in an audio input), while also discarding information that is unnecessary for performing the utility task. In some instances, this is done by embedding the input data (e.g., image, video, audio, etc.) in such a way that the unnecessary information is indistinguishable from other instances of the same type of information. In some embodiments, the techniques include discarding private or unnecessary information such that the features extracted from the input data do not allow for privacy-violating tasks such as face identification, optical character recognition, reconstruction of an input image, voice recognition, or reconstruction of input audio. In other words, when the training data is image data (e.g., still image, video, etc.) the network is trained as a scene classification network (or a network for performing other utility tasks that involve an input image)

that has an additional privacy-preserving objective that prevents the reuse of the learned features for privacy-violating tasks, for example, such as face identification. When the training data is audio data, the network is trained as a speech recognition network that has an additional privacy-preserving objective that prevents the reuse of the learned features for privacy-violating tasks, for example, such as voice recognition or reconstructing the input audio.

It should be recognized that the embodiments discussed below with respect to FIGS. 2A-6 are exemplary and are not intended to be limiting. For example, the disclosed techniques can be used to perform utility tasks other than scene classification or speech recognition and to prevent tasks other than privacy-violating tasks (or to prevent privacy-violating tasks other than those discussed herein). Additionally, various steps of the disclosed techniques may be performed at a single device, or may be performed across multiple devices. In some embodiments, some steps are performed at a first device (e.g., a mobile device; device 100a), while other steps are performed at a second device (e.g., a server).

As described below, FIGS. 2A and 2B correspond to an example embodiment in which a neural network (e.g., neural network 200) is trained by alternating at a fixed cadence between two states. In the first state, the network is trained on batches of input data (e.g., media data such as, for example, still images, video, audio, etc.) representative of a utility task (e.g., scene classification or speech recognition). In the second state, the network is trained on batches of input data representative of a privacy-preserving task. The utility loss for neural network 200 is established using the batches of input data representative of the utility task, and the privacy-preserving loss is established using the batches of input data for the privacy-preserving task.

In some embodiments, establishing the privacy-preserving loss includes implementing a Siamese network architecture, as shown in FIG. 2B, to apply a distance metric (e.g., a contrastive loss or a contractive loss) on the activations of network 200 produced by the batches of input data (e.g., images of faces, text, etc.; e.g., words in an audio sample) for the privacy-preserving task. As a result, neural network 200 maps the features from different data points of private information closer together in a feature space, which conflates the learned features. This, in turn, inhibits exploitation of features for privacy-violating tasks such as, for example, facial identification or reconstruction of faces or text (e.g., social security numbers, addresses, credit card numbers, phone numbers, etc.) in an input image, voice recognition, or reconstruction of an input audio.

FIG. 2A illustrates an exemplary embodiment of neural network 200, which is the network being trained in accordance with the present disclosure. Neural network 200 includes input layer 210, hidden layers 220, and output layer 230. Each layer of neural network 200 may comprise any number of nodes. A layer may, for example, comprise a single node or may comprise multiple nodes. These nodes, which in some embodiments may be referred to as dimensions, neurons, or units, may operate collectively as the computational elements of each layer forming neural network 200.

Input layer 210 includes input node 212. Hidden layers 220 include feature layers 222 and utility layers 224. In some embodiments, feature layers 222 and utility layers 224 form feature extraction layers that generate activations, which may also be referred to as "embeddings" or "features." Output layer 230 includes output node 232, which is used, in some embodiments, to compute utility loss 240 in comparison to ground truth label 250. The layers (e.g., 210, 220, and 230) may be referred to herein as forming portions of neural network 200 or Siamese network 205, as discussed below.

Nodes of neural network 200 can be interconnected using connections that can be unidirectional or bidirectional, and can be associated with a respective weight value. Each weight value specifies a strength of the corresponding connection and, accordingly, the relative influence of the value provided via the connection. During training of neural network 200, the connections are traversed in a forward pass and in a backward pass for back propagation. When the resulting trained network is implemented during inference (e.g., using device 100a) to perform the utility task, the connections are unidirectional. In other words, neural network 200 is a directed (unidirectional) graph that, during training, is traversed backwards.

During inference, neural network 200 can be implemented, in some embodiments, using one or more devices. For example, in some embodiments, input layer 210 and feature layers 222 can be implemented at a first device (e.g., 100a), and utility layers 224 and output layer 230 can be implemented at a second device (e.g., a remote device or server), with a network connection (e.g., an Internet connection) bridging the two (or more) devices during inference.

FIG. 2B illustrates an exemplary embodiment of Siamese network 205, which is used to train neural network 200 to perform the privacy-preserving task in accordance with the present disclosure. The architecture of Siamese network 205 is generated by creating two instances of neural network 200. As illustrated in FIG. 2B, Siamese network 205 includes first neural network 200A and second neural network 200B. First neural network 200A and second neural network 200B have shared (e.g., identical) weights and comprise Siamese network 205, including various layers of Siamese network 205, including, for example, input layer 210, hidden layers 220, and output layer 230.

As illustrated in FIG. 2B, input layer 210 includes input node 212A in first neural network 200A and input node 212B in second neural network 200B. Hidden layers 220 include feature layers 222A and utility layers 224A in first neural network 200A, and feature layers 222B and utility layers 224B in second neural network 200B. In some embodiments, feature layers 222A and 222B and utility layers 224A and 224B form feature extraction layers that generate activations, which may also be referred to as "embeddings" or "features." Output layer 230 includes output node 232A in first neural network 200A and output node 232B in second neural network 200B. Output layer 230 is, in some embodiments, used to compute utility loss 240 in comparison to ground truth label 250.

In some embodiments, neural network 200 is trained using the Siamese network architecture of Siamese network 205. This includes using backpropagation with an optimization method such as, for example, Stochastic Gradient Descent, with an additional loss applied to the optimization objective (e.g., minimizing the loss). For example, as shown in FIG. 2B, contractive loss 260 is applied to the activations of feature layers 222A and 222B. Contractive loss 260 applies a distance metric, during training of Siamese network 205, that forces activations of an input pair (e.g., two images having different faces, texts, etc.; two audio inputs having different voices speaking the same word(s)) to be similar. In other words, contractive loss 260 on the activations from the two different inputs of the input pair can be a loss encouraging the distance between the two features in a feature space to become small. As a result, the embedding (also referred to as feature) is invariant to the difference between the two inputs of the input pair (e.g., the sensitive or unnecessary information in the input data), thereby making it difficult, if not impossible, for a malicious actor to exploit the embedding (e.g., by reverse engineering the features to reconstruct the input data or extract/learn any sensitive information from the embedding). Overall loss 270 is then the weighted sum of both utility loss 240 and contractive loss 260, using a contractive loss weight factor $\alpha$, as shown in FIG. 2B.

In the embodiments disclosed herein, Siamese network 205 applies a contractive loss to the activations. However, in some embodiments, the distance metric can include a contrastive loss. This may be useful in an embodiment in which the utility task is attempting to distinguish between instances of similar inputs. For example, if the utility task is to determine if the mouth of a face is open or closed, the contrastive loss maps activations of different faces closer together and, at the same time, maps activations of identical faces away from each other if the mouth is open in one image and closed in a different image.

In some embodiments, neural network 200 is trained by alternating at a fixed cadence (e.g., after every mini batch or every epoch of inputs) between two states. In the first state, network 200 is trained on batches of inputs that correspond to the utility task. In some embodiments, this includes implementing the Siamese network architecture through Siamese network 205 with the loss weight $\alpha$ set, in some embodiments, to a low value (e.g., 0, 0.01, 0.1, etc.). In other words, in some embodiments network 200 only considers and backpropagates utility loss 240 when network 200 is being trained for the utility task. In some embodiments, training neural network 200 for the utility task involves setting loss weight $\alpha$ to a value of zero, which effectively neutralizes the Siamese network architecture (e.g., contractive loss 260). In such embodiments, neural network 200 can be trained without the Siamese network architecture of Siamese network 205 (e.g., portions of Siamese network 205 can be omitted).

In the second state, network 200 is trained (e.g., using Siamese network 205) on batches of inputs that correspond to the privacy-preserving task. That is, the training inputs represent information (e.g., private information such as text, faces, voice, etc.) that the features of network 200 should discard or become invariant to, and the loss weight $\alpha$ is set, in some embodiments, to a high value (e.g., 1, 0.99, 0.9, etc.). In other words, in some embodiments Siamese network 205 only considers contractive loss 260 and ignores utility loss 240 when network 200 is being trained for the privacy-preserving task.

When the Siamese network architecture is implemented (e.g., when loss weight $\alpha$ does not equal 0), each batch of inputs is comprised, in some embodiments, of pairs of different inputs that are provided to input layer 210 (e.g., a first input provided to input node 212A and a second (e.g., different) input provided to input node 212B). The two images uploaded to respective input nodes 212A and 212B are referred to herein as an image pair.

In some embodiments (e.g., when loss weight $\alpha$ is 0), neural network 200 can be trained without the Siamese network architecture. In such embodiments, neural network 200 is trained on input images corresponding to the utility task. For example, in order to train neural network 200 for the utility task of scene classification (e.g., of a kitchen scene), batches of images can be provided to input node 212 of neural network 200. In such cases, neural network 200 is trained on a first batch of input images of kitchens by providing images of kitchens to input node 212. This is repeated for a desired number of kitchen images in the batch (e.g., 100,000 images) to train neural network 200 on the utility task of scene classification for a kitchen. In some embodiments (e.g., when loss weight $\alpha$ is small (e.g., 0.01, 0.1, etc.), but greater than zero), neural network 200 can be trained for the utility task using the Siamese network architecture of Siamese network 205. In such embodiments, batches of images can be provided to input node 212A of first neural network 200A and input node 212B of second neural network 200B.

After training neural network 200 on the first batch of images corresponding to the utility task, Siamese network 205 is implemented to train neural network 200 on a first batch of images corresponding to the privacy-preserving task. This includes, in some embodiments, training Siamese network 205 on a first batch of image pairs of faces (e.g., either with or without a kitchen scene (e.g., the scene associated with the utility task)) by uploading a first image of a face (e.g., an image containing facial image data) to input node 212A and a second image of a different face to input node 212B. The loss weight $\alpha$ is set to a non-zero value (e.g. 1), applying contractive loss 260 to the features generated by feature layers 222A and 222B from the input image pair. This maps the features of the face images closer together so that all faces map to a single cluster in a feature space, thereby becoming indistinguishable. This process is repeated using images of faces for random, non-identical identities for the desired number of images in the batch.

This training method is repeated for a desired number of batches (e.g., 100,000 batches), alternating between the first and second states in which batches of different kitchen images and batches of different facial image pairs are provided to the network (e.g., neural network 200 during the first state, and Siamese network 205 during the second state). By repeatedly training in this manner, the neural network 200 learns to, for example, detect the presence of a face in an input image without learning the features of individual and/or user-specific faces. As a result, the network maps the activations from different facial identities closer together, which conflates the learned features, thereby inhibiting exploitation of such features for privacy-violating tasks, such as facial identification or reconstruction of faces in an input image.

In some embodiments, loss weight $\alpha$ is adjusted during training. For example, in some instances, loss weight $\alpha$ starts at a low value (e.g., 0.0 or 0.1) during training for the utility task and, after a given number of iterations (e.g., 0 or 1,000,000), is increased at a fixed rate and cadence (e.g., loss weight $\alpha$ increases by 0.001 after every 1,000 iterations). Adjusting loss weight $\alpha$ can be useful for controlling the trade-off between performance of the utility task and performance of the privacy-preserving task, which can be used to solve an optimization problem of an objective function that determines optimal value of the weight (e.g., $\alpha$) for a given interval. The objective function can be any arbitrary function that improves both utility and contractive loss, or either improves one over the other in a controlled manner. For example, in some embodiments, the utility performance and the preservation of privacy are competing objectives. In such embodiments, the utility performance often degrades with increasing weight of the privacy objective. For example, if the utility task is to recognize celebrities while the privacy objective is to protect identities of non-celebrities, the similarity of the two tasks can make it difficult to learn features that make one task succeed while the other fails. This is because a network that can recognize celebrities would have learned the distinguishing features of faces, which could also be used to recover the identities of non-celebrities. Accordingly, loss weight α can be adjusted to control the trade-off between preserving privacy and performance of the utility task in Siamese network 205.

In some embodiments, the training images can be used for both the utility task and the privacy-preserving task. For example, in some embodiments, images used for training the utility task of scene classification (e.g., images of a kitchen scene) can be generated in such a way that they can also be used for the privacy-preserving task of preventing face identification. One way in which these images could be generated is to create the training images by staging a scene that corresponds to the classification task, physically placing people in the scene, and capturing the image via a camera or other image device.

A more efficient and cost-effective method for generating these image pairs, however, is modifying or augmenting the training images used for the utility task such that the modified images include the features that the network is being trained to discard or be invariant to (e.g., private information such as faces, text, etc.). These image pairs are then used to train the network to enable classification of images (e.g., the utility task), and also to train the network to become invariant to faces in images (e.g., preventing the identification or reconstruction of faces present in input images (e.g., the privacy-preserving task)). These image pairs, which may be referred to herein as "invariant image pairs," can be generated by superimposing faces of different identities onto the original image (e.g., the training image of the utility task). In some embodiments, the faces are positioned randomly in the image (e.g., see FIGS. 4A-4C), or so that the faces align with existing faces in the image (e.g., see FIGS. 3A-3C). In some embodiments, a pair of images form an invariant image pair if the two images differ only by parameters which the privacy-preserving feature is invariant to (e.g., if the images should result in the same embedding or feature). For example, an invariant image pair can include a pair of images in which the background image is the same and all spatial parameters (e.g., position, orientation, scale) of the face augmentation are the same, with the only difference between the images in the pair being the identity of the superimposed faces.

Figure 3A:
FIGS. 3A-3C illustrate example images for training a network, according to various embodiments of the present disclosure.
Figure 3B:
Figure 3C:

For example, FIGS. 3A-3C illustrate an embodiment in which an invariant image pair is generated from an input (e.g., training) image that includes faces in the original training image. FIG. 3A shows training image 305 used, for example, to train neural network 200 on the utility task of scene classification of a kitchen, or on the utility task of human pose estimation. Training image 305 illustrates a kitchen scene 315 with two subjects 311 and 312 having respective faces 321 and 322. FIGS. 3B and 3C illustrate a respective invariant image pair generated from training image 305. The image pair in FIGS. 3B and 3C is generated, for example, by augmenting training image 305 to replace faces 321 and 322 of subjects 311 and 312 with different faces. For example, FIG. 3B shows first image 310 of the invariant image pair illustrating kitchen scene 315, but with subjects 311 and 312 having respective faces 321' and 322', which are different from faces 321 and 322 (e.g., faces 321' and 322' do not have the same facial identities as faces 321 and 322 in FIG. 3A). Similarly, FIG. 3C shows second image 320 of the invariant image pair illustrating kitchen scene 315, but with subjects 311 and 312 having respective faces 321" and 322", which are different from faces 312, 322, 321', and 322'.

In some embodiments, faces 321', 322', 321" and 322" can be random, non-identical faces that have been embedded in training image 305 to form respective images 310 and 320. In some embodiments, the spatial properties of the faces in the invariant image pair (e.g., FIGS. 3B and 3C) are identical to the spatial properties of the faces in the training image (e.g., FIG. 3A). For example, faces 321' and 321" have the same relative position, orientation, and scale as face 321 in training image 305. Faces 322' and 322" have the same relative position, orientation, and scale as face 322 in training image 305. In some embodiments, such as that shown in FIGS. 3A and 3B, the subjects can have not only different faces, but different heads (e.g., with different hair and/or other features that the network would become invariant to). FIGS. 3B and 3C illustrate a single invariant image pair. In some embodiments, the original training image can form one of the images of the invariant image pair. For example, FIG. 3A (i.e. the original training image) and FIG. 3B form an invariant image pair (as do FIG. 3A and FIG. 3C). It should be appreciated that any number of invariant image pairs can be generated for training Siamese network 205.

Figure 4A:
FIGS. 4A-4C illustrate example images for training a network, according to various embodiments of the present disclosure.
Figure 4B:
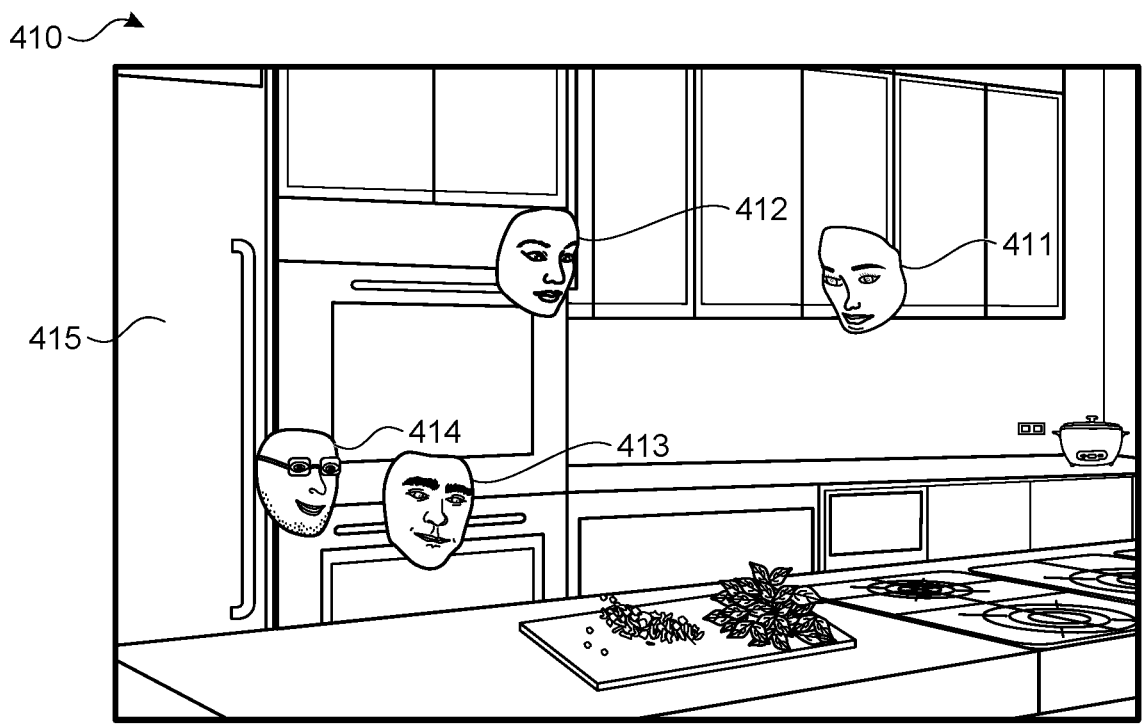
Figure 4C:
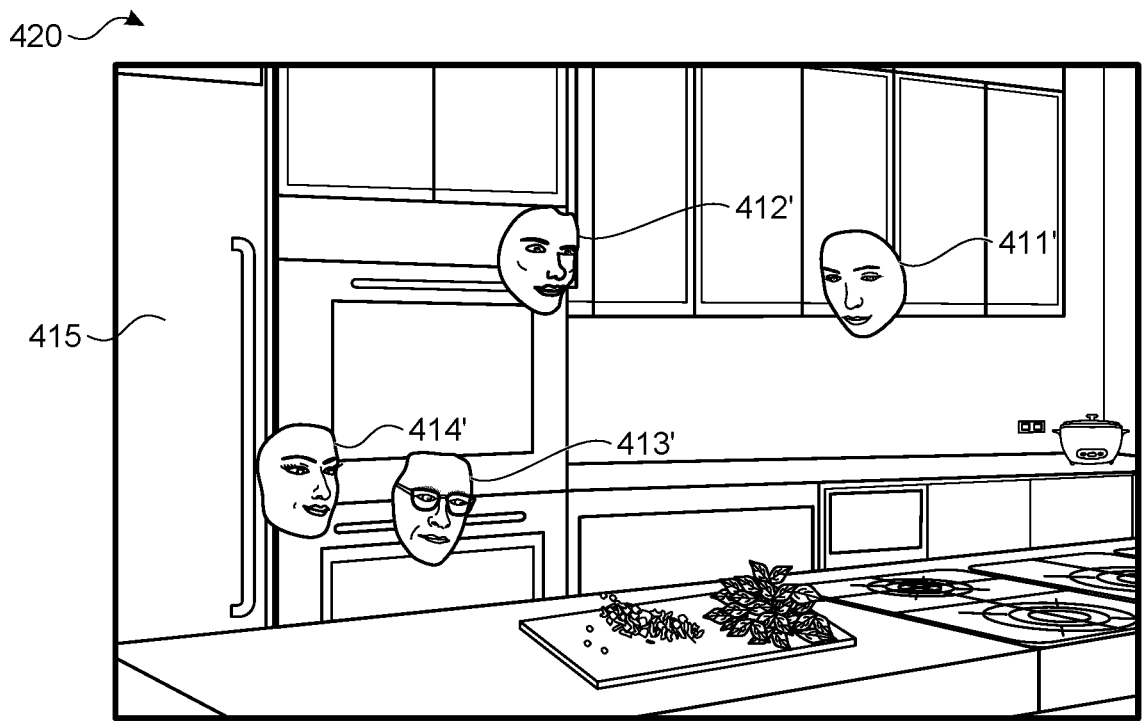

FIGS. 4A-4C illustrate an embodiment in which an invariant image pair is generated from an input (e.g., training) image that does not include faces in the original training image. FIG. 4A shows training image 405 used, for example, to train neural network 200 on the utility task of scene classification of a kitchen. Training image 405 illustrates a kitchen scene 415 with no subjects or faces. FIGS. 4B and 4C illustrate a respective invariant image pair generated from training image 405. The image pair in FIGS. 4B and 4C is generated, for example, by augmenting training image 405 to include faces 411-414 and 411'-414'. For example, FIG. 4B shows first image 410 of the invariant image pair illustrating kitchen scene 415, but modified to include facial image data in the form of faces 411-414 positioned randomly in the scene. Similarly, FIG. 4C shows second image 420 of the invariant image pair illustrating kitchen scene 415, but modified to include facial image data in the form of faces 411'-414' replacing faces 411-414 of first image 410.

In some embodiments, faces 411-414 and 411'-414' can be random, non-identical faces that have been embedded in training image 405 to form respective images 410 and 420. In some embodiments, the faces in the invariant image pair (e.g., faces 411-414 in FIG. 4B and faces 411'-414' in FIG. 4C) have various positions, sizes, and scales in the images (e.g., 410 and 420). However, the spatial properties of respective faces 411-414 and 411'-414' are consistent between first image 410 and second image 420. For example, face 411 is different (e.g., a different facial identity) from faces 412-414 and 411'-414', however face 411 has identical spatial properties as face 411', and different spatial properties than faces 412-414 and 412'-414'. FIGS. 4B and 4C illustrate a single invariant image pair. However, it should be appreciated that any number of invariant image pairs can be generated for training Siamese network 205.

Although the invariant image pairs are described above as being generated based on existing training images, in some embodiments (e.g., when loss weight α is a high value (e.g., 1)), the invariant image pairs do not include information for training the utility loss. For example, the invariant image pairs can include faces (or whatever data is the target of the privacy-preserving objective (e.g., text)) generated in scenes other than those corresponding to the utility task, as long as the individual images in an invariant image pair have the same image scene. By using different faces in each image of the image pair, while also retaining the same image scene, the network learns to disregard the differing aspects of the images (e.g., the identity of the faces), which is enabled by the additional loss (e.g., contractive loss 260) in Siamese network 205. As a result, the embedding is invariant to the identity of faces, thereby making it difficult, if not impossible, for a malicious actor to identify or reconstruct a face based on the embedding.

Figure 5A:
FIGS. 5A and 5B illustrate example images for training a network, according to various embodiments of the present disclosure.
Figure 5B:
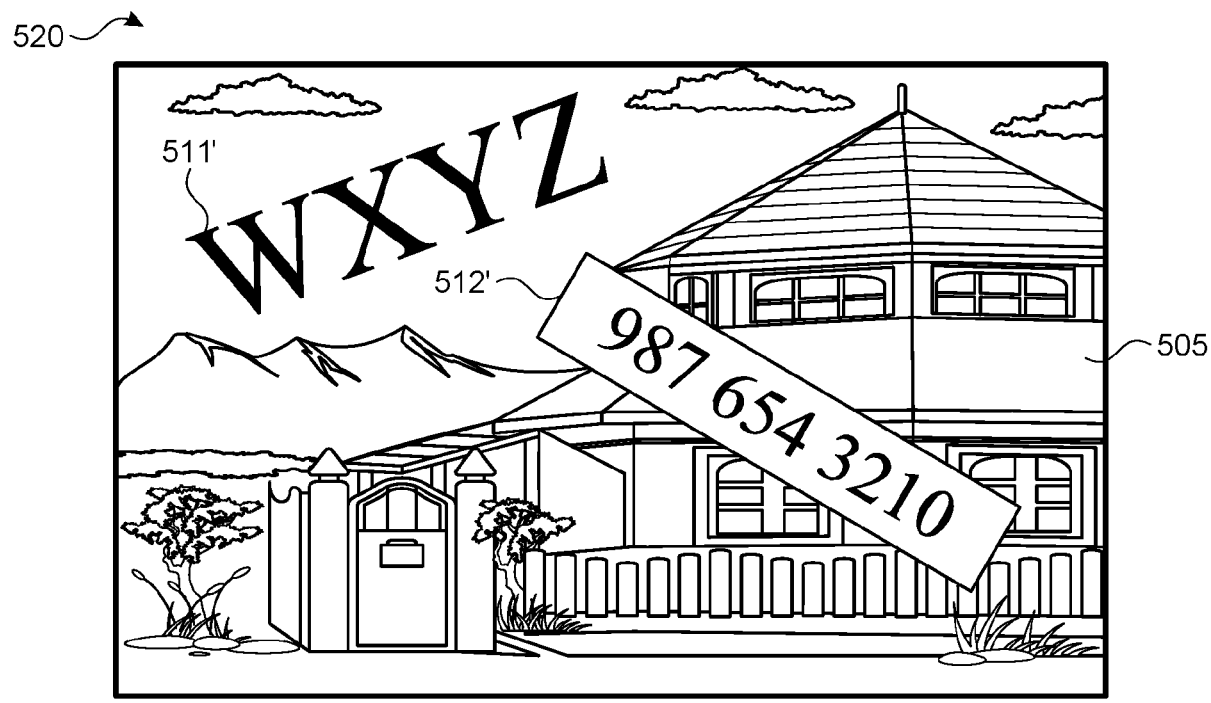

The above embodiments disclose generating invariant image pairs by inserting facial image data into a training image. It should be appreciated that these techniques can be applied in similar manners to generate invariant image pairs having other features such as, for example, text. For example, FIGS. 5A and 5B illustrate an example invariant image pair comprising first image 510 and second image 520. First image 510 includes image scene 505 having text 511, which reads "ABCD," and text 512, which reads "012 345 6789," superimposed over image scene 505. Second image 520 includes image scene 505 having text 511 replaced with text 511', which reads "WXYZ," and text 512 replaced with text 512', which reads "987 654 3210." Text 511' and text 512' are superimposed over image scene 505 and have a same spatial positioning as respective text 511 and text 512 in first image 510. The invariant image pair illustrated in FIGS. 5A and 5B can be generated in accordance with the above embodiments describing the addition of facial image data with respect to FIGS. 3A-3C and 4A-4C.

The above embodiments describing generating invariant image pairs can also be applied in similar manners to generate invariant audio pairs in embodiments in which the input provided to Siamese network 205 during training is audio input (e.g., the audio input is applied to input layer 210 in a manner similar to that in which image data is applied to input layer 210). In such embodiments, one method for generating the augmented input data is to separately record two people speaking the same words, in the same acoustical manner (e.g., having same audio characteristics such as cadence, pitch, tone, speed, etc.), wherein each recording is an audio input of the invariant audio input pair. A more efficient approach, however, is to generate two audio samples in which each sample is produced by sampling spoken words from a larger body of spoken words of two people, and assembling the words together to form audio samples of identical sentences. In some embodiments, the audio characteristics of the audio samples can be digitally altered in a data augmentation state to be consistent across both audio samples to produce an invariant audio input pair in an analogous manner to that in which the position, orientation, size, and facial expression of two faces in an invariant image pair are identical.

In various embodiments, the network is described as being trained using an electronic device, using a media item (e.g., an image, video, audio file, etc.) as input training data, and is also described as being implemented using an electronic device to process such media items to perform a utility task. In some embodiments, the training and implementation of the trained network can be performed using other types of data, wherein this training and implementation is performed in an analogous manner to that described herein with respect to the media item. For example, the network can be trained (and later implemented) using input training data that includes spatial/geometrical input data such as depth maps, 3D volumes, 3D point clouds, 3D meshes, or other representations of 3D geometry. In some embodiments, this data may be generated in various manners. For example, the spatial/geometrical data may be obtained based on a laser scan of a scene such as a kitchen, which may include the geometry of faces of people present in the kitchen. Analogously to what is disclosed herein for images, in some embodiments, the training input data can include invariant depth map pairs, invariant 3D volume pairs, invariant 3D point cloud pairs, and invariant 3D mesh pairs. In some embodiments, these invariant pairs can be generated by inserting the geometry of different faces at the same position in the two inputs of such a pair. In some embodiments, these invariant pairs can be used to train a neural network (e.g., 200) using a Siamese network architecture (e.g., 205) in a manner that generates features that allow for a utility task, such as scene classification (e.g., from the spatial/geometrical input data (e.g., 3D point cloud)), while also preventing or inhibiting performance of privacy-violating tasks such as, for example, face identification (e.g., using the spatial/geometrical input data (e.g. 3D point cloud)).

Turning now to FIG. 6, a flow chart is depicted for an exemplary method 600 for training an embedding network for performing a utility task while inhibiting performance of a secondary task. Method 600 can be performed using an electronic device (e.g., 100a). In some embodiments, method 600 can be performed using two or more electronic devices, such as a first device that is communicatively coupled to another device, such as a base device or remote server. In these embodiments, the operations of method 600 are distributed in any manner between the first device and the other device. Although the blocks of method 600 are depicted in a particular order in FIG. 6, it should be appreciated that these blocks can be performed in other orders. Further, one or more blocks of method 600 can be partially performed, optionally performed, combined with another block(s), and/or additional blocks can be performed.

At block 601, the device (e.g., 100a) trains a neural network (e.g., 200, 200A, 200B, 205) (e.g., a Siamese network, a convolution neural network) using a first loss (e.g., 240) (e.g., a utility loss) associated with a first task (e.g., a utility task; e.g., scene classification of an image (video or still image), object detection, human pose estimation, speech recognition of an audio input) and a second loss (e.g., 260) (e.g., a contractive loss) associated with (e.g., inhibiting) a second task (e.g., a privacy-violating task; e.g., facial identification and/or reconstruction of faces or other sensitive information (e.g., text) in an input image; e.g., optical character recognition; e.g., voice recognition or reconstruction of an input audio file) different from the first task. In some embodiments, the second loss is associated with the second task in that the second loss is used to reduce a distance in a feature space between features extracted from a collection of inputs, so that the extracted features become invariant to differences between the collection of inputs, thereby preventing use of those features for performing the second task (e.g., a privacy-violating task).

In some embodiments, the first loss is a utility loss (e.g., 240). In some embodiments, the first task is a utility task of the neural network (e.g., 200). In some embodiments, the utility task includes a classification task (e.g., scene classification). In some embodiments, the utility task includes a speech recognition task.

In some embodiments, the second task is a privacy-violating task (e.g., face identification, optical character recognition, reconstruction of an input image, voice recognition, reconstruction of an input audio).

In some embodiments, the second loss includes a contractive loss (e.g., 260) (e.g., mapping extracted features to a common location (point/cluster) in a feature space; e.g., reducing a distance between extracted features in a feature space). In some embodiments, the second loss has a first weight (e.g., loss weight α has a first value) (e.g., a weight of zero) applied during the first training operation and a second weight (e.g., loss weight α has a second value) (e.g., a non-zero weight) different from the first weight applied during the second training operation. In some embodiments, the first weight is less than the second weight. For example, during the first training operation, the second loss (e.g., the contractive loss) has a weight of zero, 0.01, or 0.1, and during the second training operation, the second loss has a weight of 1, 0.99, or 0.9. In some embodiments, training the neural network (e.g., 200, 200A, 200B, 205) further includes, after performing the second training operation a number of instances, adjusting (e.g., increasing or decreasing) the second weight (e.g., increasing the weight of the contractive loss by 0.001 after every 1,000 iterations of performing the second training operation).

In some embodiments, the second loss (e.g., 260) is associated with inhibiting performance of the second task. In some embodiments, the second loss is used to reduce a distance in a feature space between features extracted from a collection of inputs, so that the extracted features become invariant to differences between the collection of inputs, thereby preventing use of those features (e.g., by another network, device, user, etc. having access to the features extracted by the neural network) for performing the second task (e.g., a privacy-violating task).) In some embodiments, performance of the second task is inhibited because the extracted features are conflated with other learned features of the network. As such, a malicious actor having access to the extracted features is unable to distinguish the features from similar features in previously uploaded items (e.g., training images or training audio samples), thereby rendering the extracted features unusable for performing the second task (e.g., a privacy-violating task)).

At block 602, the device (e.g., 100a) performs a first training operation (e.g., uploading a batch of images associated with the utility task; e.g., uploading a batch of audio samples associated with the utility task) associated with (e.g., to achieve) the first loss (e.g., 240).

In some embodiments, the first training operation includes providing, to the neural network (e.g., 200, 200A, 200B, 205), a plurality of input items associated with the first task (e.g., uploading images for training the neural network on the first task; e.g., different images of a common scene; e.g., uploading audio files (e.g., audio samples) for training the neural network on the first task; e.g., different audio samples of the same spoken words).

In some embodiments, the input items associated with the first task include audio samples associated with the first task.

In some embodiments, the input items associated with the first task include images (e.g., still images or videos) associated with the first task. In some embodiments, the images omit items (e.g., image data) associated with the second task. For example, the first task may be a utility task for scene classification of a kitchen and the second task may be a privacy-preserving task for preventing recognition of faces or text in an image. In this example, the images associated with the first task include images of kitchens without faces or text in the images.

At block 603, the device (e.g., 100a) performs a second training operation (e.g., uploading a batch of images (e.g., 305, 310, 320, 410, 420, 510, 520) (e.g., image pairs, such as those shown in FIGS. 3A-3C, 4A-4C, and 5A-5B) associated with the privacy-preserving task; e.g., uploading a batch of audio samples (e.g., audio pairs) associated with the privacy-preserving task) associated with (e.g., to achieve) the second loss (e.g., 260). In some embodiments, the second training operation includes providing, to the neural network (e.g., 200, 200A, 200B, 205), a plurality of input items associated with the second task (e.g., 305, 310, 320, 410, 420, 510, 520) (e.g., images (still images and/or videos) having data that is unnecessary for performing the first task or sensitive data (e.g., facial image data, text, etc.); e.g., audio samples having data that is unnecessary for performing the first task or sensitive data (e.g., a person's voice, pitch, tone, cadence, etc.); 3D image data (e.g., spatial/geometrical input data)). In some embodiments, the second training operation is performed after the first training operation. In some embodiments, the first training operation and the second training operation are performed in an alternating sequence.

In some embodiments, training the neural network (e.g., 200, 200A, 200B, 205) further includes, after performing the second training operation, performing the first training operation associated with the first loss (e.g., 240).

In some embodiments, the plurality of input items associated with the second task include audio samples having different audio characteristics (e.g., a person's voice, cadence, pitch, tone, etc.).

In some embodiments, the plurality of input items associated with the second task include images having different facial image data (e.g., or different text).

In some embodiments, performing the second training operation comprises training the neural network (e.g., 200, 200A, 200B, 205) to extract features from the plurality of input items associated with the second task such that performance of the second task using the extracted features is inhibited. In some embodiments, performance of the second task (e.g., by another network, device, user, etc. having access to the features extracted by the neural network) is inhibited because the features are extracted by the trained network in such a way (e.g., mapping to a common point/cluster in a feature space; e.g., reducing the distance between the extracted features in the feature space) that the features are conflated with other learned features of the network. As such, a malicious actor having access to the extracted features is unable to distinguish the features from similar features in previously uploaded items (e.g., training images or training audio samples), thereby rendering the extracted features unusable for performing the second task (e.g., a privacy-violating task).

In some embodiments, the second training operation further includes training the neural network (e.g., 200, 200A, 200B, 205) to extract features from input items having dissimilar elements (e.g., non-identical faces; e.g., non-identical voices; e.g., different text) present in one or more of the plurality of input items associated with the second task to a common location (e.g., a common point/cluster) in a feature space (e.g., reducing a distance between the extracted features in the feature space). In some embodiments, the second loss (e.g., 260) is representative of a distance metric between the extracted features from the input items having dissimilar elements.

In some embodiments, the plurality of input items associated with the second task include one or more sets (e.g., pairs) of images (e.g., 305, 310, 320, 410, 420, 510, 520) having a set of distinct elements (e.g., faces, text) (e.g., 321, 321', 321'', 322, 322', 322'', 411-414, 411'-414', 511, 511', 512, 512') associated with the second task (e.g., images of non-identical faces) (e.g., images having non-identical text) (e.g., features that correspond to a training objective of the second task (e.g., privacy preservation)) (e.g., parameters in the input items that the features extracted in the second training operation are invariant to). In some embodiments, the one or more sets of images further include a set of similar (e.g., identical) elements (e.g., similar or identical background image data) associated with the first task (e.g., images of a common scene) (e.g., elements that correspond to a training objective of the first task (e.g., scene classification)).

In some embodiments, training the neural network (e.g., 200) using the second loss includes performing the second training operation using a Siamese network architecture (e.g., 205).

In some embodiments, the second training operation further includes providing a first subset of the sets of images (e.g., 305, 310, 410, 510) to a first portion (e.g., 210, 212A) of the neural network (e.g., a first neural network (e.g., 200A) comprising a Siamese network architecture (e.g., 205)), and providing a second subset of the sets of images (e.g., 310, 320, 420, 520) to a second portion (e.g., 210, 212B) of the neural network (e.g., a second neural network (e.g., 200B) comprising the Siamese network architecture (e.g., 205)). In some embodiments, the second loss (e.g., 260) is a distance metric between features extracted from the first subset of the sets of images by the first portion of the embedding network and features extracted from the second subset of the sets of images by the second portion of the embedding network.

In some embodiments, the second training operation further includes, prior to providing to the neural network (e.g., 200, 200A, 200B, 205) the plurality of input items associated with the second task (e.g., 305, 310, 320, 410, 420, 510, 520): in accordance with a determination that the plurality of input items associated with the second task includes a respective set of images (e.g., 405) that exclude a respective element (e.g., a face, text, etc.) (e.g., an element associated with a training objective of the second task (e.g., privacy preservation)) associated with the second task, modifying the respective set of images to include the respective element associated with the second task.

In some embodiments, modifying the respective set of images to include the respective element associated with the second task includes modifying (e.g., augmenting) a first image (e.g., 410, 510) of the respective set of images to include a first version of the respective element (e.g., a first face (e.g., 411, 412, 413, 414); e.g., a first set of text (e.g., 511, 512)), and modifying (e.g., augmenting) a second image (e.g., 420, 520) of the respective set of images to include a second version of the respective element different from the first version of the respective element (e.g., a second face distinct from the first face (e.g., 411', 412', 413', 414'); e.g., a second set of text different from the first set of text (e.g., 511', 512')). In some embodiments, the first version of the respective element is positioned in the first image at a first location, and the second version of the respective element is positioned in the second image at the first location (e.g., the first and second faces are positioned in their respective images at the same location; e.g., the first and second sets of text are positioned in their respective images at the same location; e.g., the first and second faces have same spatial properties (e.g., size, orientation, position, scale, angle, etc.); e.g., the first and second sets of text have same spatial properties (e.g., size, orientation, position, scale, angle, etc.)).

In some embodiments, method 600 further includes, after training the neural network (e.g., 200), receiving an input image for performing the first task, wherein the first task includes a visual search and the input image includes image data of a first type (e.g., sensitive data; private or unnecessary image data such as a person's face, credit card number, legal documents, etc.), extracting features using the input image, and performing the first task using the extracted features (e.g., performing a scene classification of the input image), while inhibiting use of the image data of the first type to perform the second task.

In some embodiments, method 600 further includes, after training the neural network (e.g., 200), receiving an input audio for performing the first task, wherein the first task includes speech recognition and the input audio includes audio data of a first type (e.g., sensitive data; private or unnecessary (with respect to the task of speech recognition) audio data such as a person's voice, cadence, pitch, etc.), extracting features using the input audio, and performing the first task using the extracted features (e.g., performing speech recognition using the audio input), while inhibiting use of the audio data of the first type to perform the second task.

Executable instructions for performing the features of method 600 described above are, optionally, included in a transitory or non-transitory computer-readable storage medium (e.g., memory(ies) 106) or other computer program product configured for execution by one or more processors (e.g., processor(s) 102).

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

As described above, one aspect of the present technology is the gathering and use of data available from various sources to train a network to perform a visual search of an image or recognize words in an audio file. The present disclosure contemplates that in some instances, this gathered data may include personal information data that uniquely identifies or can be used to contact or locate a specific person. Such personal information data can include demographic data, location-based data, telephone numbers, email addresses, user IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to enable a visual search of content that is specific to the user or to enable the recognition of words spoken by the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of performing a visual search, the present technology can be configured to allow users to obscure the images used for searching to exclude personal information. In addition, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. In addition to the methods discussed above, risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented, in some instances, without the need for accessing such personal information data. That is, the various examples of the present technology are not rendered inoperable due to the lack of all or a portion of such personal information data.

What is claimed is:

1. An electronic device, comprising:
one or more processors; and
memory storing one or more programs configured to be executed by the one or more processors, the one or more programs including instructions for:
training a neural network using a first loss associated with a first task and a second loss associated with a second task different from the first task, including:
performing a first training operation associated with the first loss; and
performing a second training operation associated with the second loss, wherein the second training operation includes providing, to the neural network, a plurality of input items associated with the second task, wherein the plurality of input items associated with the second task include one or more sets of images having a set of distinct elements associated with the second task, and wherein the one or more sets of images further include a set of similar elements associated with the first task.

2. The electronic device of claim 1, wherein training the neural network further includes:
after performing the second training operation, performing the first training operation associated with the first loss.

3. The electronic device of claim 1, wherein the plurality of input items associated with the second task include audio samples having different audio characteristics or images having different facial image data.

4. The electronic device of claim 1, wherein the first training operation includes providing, to the neural network, a plurality of input items associated with the first task.

5. The electronic device of claim 4, wherein the input items associated with the first task include audio samples associated with the first task or images associated with the first task.

6. The electronic device of claim 1, wherein performing the second training operation comprises training the neural network to extract features from the plurality of input items associated with the second task such that performance of the second task using the extracted features is inhibited.

7. The electronic device of claim 1, wherein:
the second training operation further includes training the neural network to extract features from input items having dissimilar elements present in one or more of the plurality of input items associated with the second task to a common location in a feature space, and
the second loss is representative of a distance metric between the extracted features from the input items having dissimilar elements.

8. The electronic device of claim 1, wherein the second training operation further includes providing a first subset of the sets of images to a first portion of the neural network, and providing a second subset of the sets of images to a second portion of the neural network.

9. The electronic device of claim 8, wherein the second loss is a distance metric between features extracted from the first subset of the sets of images by the first portion of the neural network and features extracted from the second subset of the sets of images by the second portion of the neural network.

10. The electronic device of claim 1, wherein the second training operation further includes:
prior to providing, to the neural network, the plurality of input items associated with the second task:
in accordance with a determination that the plurality of input items associated with the second task includes a respective set of images that exclude a respective element associated with the second task, modifying the respective set of images to include the respective element associated with the second task.

11. The electronic device of claim 10, wherein modifying the respective set of images to include the respective element associated with the second task includes:
modifying a first image of the respective set of images to include a first version of the respective element; and modifying a second image of the respective set of images to include a second version of the respective element different from the first version of the respective element, wherein the first version of the respective element is positioned in the first image at a first location, and the second version of the respective element is positioned in the second image at the first location.

12. The electronic device of claim 1, wherein the second loss is associated with inhibiting performance of the second task.

13. The electronic device of claim 1, wherein the second loss has a first weight applied during the first training operation and a second weight different from the first weight applied during the second training operation, wherein training the neural network further includes:

after performing the second training operation a number of instances, adjusting the second weight.

14. The electronic device of claim 1, wherein the first task is a utility task of the neural network and the second task is a privacy-violating task.

15. The electronic device of claim 1, the one or more programs further including instructions for:

after training the neural network:
receiving an input image for performing the first task, wherein the first task includes a visual search and the input image includes image data of a first type;
extracting features using the input image; and
performing the first task using the extracted features, while inhibiting use of the image data of the first type to perform the second task.

16. The electronic device of claim 1, the one or more programs further including instructions for:

after training the neural network:
receiving an input audio for performing the first task, wherein the first task includes speech recognition and the input audio includes audio data of a first type;
extracting features using the input audio; and
performing the first task using the extracted features, while inhibiting use of the audio data of the first type to perform the second task.

17. A non-transitory computer-readable storage medium storing one or more programs configured to be executed by one or more processors of an electronic device, the one or more programs including instructions for:

training a neural network using a first loss associated with a first task and a second loss associated with a second task different from the first task, including:
performing a first training operation associated with the first loss; and
performing a second training operation associated with the second loss, wherein the second training operation includes providing, to the neural network, a plurality of input items associated with the second task, wherein the plurality of input items associated with the second task include one or more sets of images having a set of distinct elements associated with the second task, and wherein the one or more sets of images further include a set of similar elements associated with the first task.

18. The non-transitory computer-readable storage medium of claim 17, wherein performing the second training operation comprises training the neural network to extract features from the plurality of input items associated with the second task such that performance of the second task using the extracted features is inhibited.

19. The non-transitory computer-readable storage medium of claim 17, wherein:

the second training operation further includes training the neural network to extract features from input items having dissimilar elements present in one or more of the plurality of input items associated with the second task to a common location in a feature space, and the second loss is representative of a distance metric between the extracted features from the input items having dissimilar elements.

20. The non-transitory computer-readable storage medium of claim 17, wherein the second loss is associated with inhibiting performance of the second task.

21. A method, comprising:
at an electronic device:
training a neural network using a first loss associated with a first task and a second loss associated with a second task different from the first task, including:
performing a first training operation associated with the first loss; and
performing a second training operation associated with the second loss, wherein the second training operation includes providing, to the neural network, a plurality of input items associated with the second task, wherein the plurality of input items associated with the second task include one or more sets of images having a set of distinct elements associated with the second task, and wherein the one or more sets of images further include a set of similar elements associated with the first task.

22. The method of claim 21, wherein performing the second training operation comprises training the neural network to extract features from the plurality of input items associated with the second task such that performance of the second task using the extracted features is inhibited.

23. The method of claim 21, wherein:
the second training operation further includes training the neural network to extract features from input items having dissimilar elements present in one or more of the plurality of input items associated with the second task to a common location in a feature space, and the second loss is representative of a distance metric between the extracted features from the input items having dissimilar elements.

24. The method of claim 21, wherein the second loss is associated with inhibiting performance of the second task.

* * * * *